(12) United States Patent
Vaures et al.

(10) Patent No.: US 10,997,587 B2
(45) Date of Patent: May 4, 2021

(54) COLLECTING TRANSACTION HISTORY DATA ON A TERMINAL

(71) Applicant: IDEMIA FRANCE, Courbevoie (FR)

(72) Inventors: Pierre Vaures, Colombes (FR); Antoine Vilain, Colombes (FR); Benoit Mouroux, Colombes (FR); Francis Chamberot, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/230,018

(22) Filed: Dec. 21, 2018

(65) Prior Publication Data
US 2019/0197524 A1  Jun. 27, 2019

(30) Foreign Application Priority Data
Dec. 22, 2017  (FR) ...................... 1763185

(51) Int. Cl.
| | |
|---|---|
| *G06F 17/40* | (2006.01) |
| *G06F 21/77* | (2013.01) |
| *G06F 21/35* | (2013.01) |
| *G06Q 20/34* | (2012.01) |
| *H04L 29/08* | (2006.01) |

(Continued)

(52) U.S. Cl.
CPC ........... *G06Q 20/352* (2013.01); *G06F 17/40* (2013.01); *G06F 21/35* (2013.01); *G06F 21/77* (2013.01); *G06K 7/10366* (2013.01); *G06Q 20/32* (2013.01); *G06Q 20/34* (2013.01); *G06Q 20/341* (2013.01); *H04L 67/22* (2013.01)

(58) Field of Classification Search
CPC ........ G06F 16/178; G06F 17/40; G06F 21/77; G06F 21/35; G06Q 20/351; G06Q 20/10; G06Q 20/20; G06Q 40/00; G06Q 20/352; G06Q 20/132
See application file for complete search history.

(56) References Cited

U.S. PATENT DOCUMENTS

| | | | | |
|---|---|---|---|---|
| 2006/0069809 A1* | 3/2006 | Serlet | ................... | G06F 16/219 709/248 |
| 2010/0252624 A1* | 10/2010 | Van de Velde | .... | G06Q 20/3827 235/382 |

(Continued)

FOREIGN PATENT DOCUMENTS

WO   WO-2017127869 A1 *  8/2017  ............. G06Q 20/34

*Primary Examiner* — Olabode Akintola
*Assistant Examiner* — Suckhwan Chon
(74) *Attorney, Agent, or Firm* — MH2 Technology Law Group LLP (57) ABSTRACT

A method for collecting transaction history data and an associated terminal device. The method may include: collecting on-line, from a remote server (SV), first history data (DT) representative of at least one transaction associated with a user account (15); communicating contactlessly with a smart card (2), during which the terminal (T) recovers second history data (DH) stored locally in a memory (10) of the smart card, the second history data being representative of transactions processed by the smart card in association with the user account (15); and analyzing, during which the terminal (T) aggregates the first and second history data in order to obtain up-to-date history data. It is thus possible to generate transaction-following data from the up-to-date history data.

15 Claims, 4 Drawing Sheets

(51) Int. Cl.
G06K 7/10 (2006.01)
G06Q 20/32 (2012.01)

(56) References Cited

U.S. PATENT DOCUMENTS

| | | | |
|---|---|---|---|
| 2013/0198046 A1* | 8/2013 | Hammad | G06Q 30/06 705/30 |
| 2015/0081461 A1* | 3/2015 | Adrangi | G06Q 20/204 705/17 |
| 2020/0097947 A1* | 3/2020 | Zhai | G06Q 20/351 |

* cited by examiner

COLLECTING TRANSACTION HISTORY DATA ON A TERMINAL

CROSS-REFERENCE TO RELATED APPLICATIONS

This application claims priority to French Application No. 1763185 filed 22 Dec. 2017.

BACKGROUND OF THE INVENTION

The present invention lies in the general field of terminals, and it relates more particularly to using a terminal for consulting data representing transaction history, e.g. in the field of banking.

In known manner, the bearer of a bank card can use that card to carry banking transactions, e.g. such as payment transactions, in association with a bank account. The user can also follow the state of the bank account (balance, amounts and dates of transactions) using statements issued regularly by the bank.

Nevertheless, it is difficult at present for the user of a bank card to follow in real time the transactions carried out by the user in association with a bank account. A longer or shorter waiting time is necessary to enable the bank to process recent transactions carried out using a bank card and then to issue a new statement taking those recent transactions into account.

A monthly statement serves to draw up a balance over a period of past time, but it is not intended to provide information about the status of a bank account in real time. It is sometimes possible to perform on-line consultation of the balance of an account or of transactions that have been carried out in association with an account, but the information provided by the bank is not always exhaustive.

Thus, at present, there does not exist a satisfactory solution for enabling the user of a bank card, and more generally of a smart card, to obtain reliable and up-to-date information about the state of a user account associated with that card. In particular, there exists a need to enable the state of a bank account associated with a bank card to be followed in real time.

OBJECT AND SUMMARY OF THE INVENTION

To this end, the present invention provides a processing method performed by a terminal, said method comprising the following steps:
  a collection step for collecting on-line, from a remote server, first history data representative of at least one transaction associated with a user account;
  a communication step for communicating contactlessly with a smart card, during which the terminal recovers second history data stored locally in a memory of the smart card, said second history data being representative of at least one transaction processed by the smart card in association with the user account;
  an analysis step for analyzing during which the terminal aggregates the first history data with the second history data in order to obtain up-to-date history data; and
  a generation step for generating transaction-following data on the basis of the up-to-date history data.

The invention serves advantageously to enable a user of a bank card, and more generally of a smart card, to obtain information that is reliable and up-to-date about the state of a user account associated with the card. In particular, the user can follow in real time the state of a bank account associated with a bank card. This real-time following is made possible because the account data collected on-line is updated using recent transactions carried out with the user's smart card. The on-line consultation of the state of the account, e.g. via an Internet portal, cannot by itself enable information to be obtained about the current state of the account if recent transactions processed by the smart card have not yet been taken into account by the bank.

In a particular implementation, the analysis step comprises:
  comparing first history data collected on-line with the second history data recovered during the communication step in order to detect at least one new transaction in the second history data that is not included in the first transaction data; and
  aggregating the history data of said at least one new transaction with the first history data so as to obtain up-to-date history data.

In a particular implementation, the second history data recovered during the communication step satisfies a predetermined time condition.

In a particular implementation, the transaction-following data is representative of a current state of the user account.

In a particular implementation, the terminal is a communication terminal suitable for receiving short message service (SMS) messages using the 3D secure (3DS) payment protocol;
  the method including a step of receiving third history data by means of at least one SMS message;
  wherein, during the updating step, the first history data is updated from the second and third history data.

In a particular implementation, the communication step comprises:
  a first read during which the terminal consults a first log file in the smart card in order to recover second history data stored in a first data format; and
  a second read during which the terminal consults a second log file in the smart card in order to recover second history data stored in a second data format that is smaller in size than the first data format.

In a particular implementation, the first log file comprises at least one entry including first history data in the first data format, representative of a respective transaction;
  wherein the second log file comprises at least one entry including first history data in the second data format, representative of a respective transaction; and
  wherein, during the first and second reads, the terminal reads each entry in the first log file and in the second log file one by one so long as the entry that is read corresponds to a transaction satisfying a predetermined time condition, such that the second history data recovered during the communication step satisfies the predetermined time condition.

In a particular implementation, the terminal detects that the second history data satisfies the time condition if it is representative of a transaction carried out at an instant later than a predetermined fixed instant.

In a particular implementation, the terminal detects that the second history data satisfies the time condition if it is representative of a transaction carried out at an instant lying in a time period of predefined duration terminating at the current instant at which the communication step is performed.

In a particular implementation, the second log file stored in the smart card comprises at least one first entry corresponding to a first transaction, and at least one earlier second entry corresponding to a second transaction earlier than the first transaction, the first entry being encoded in the second data format on the basis of said at least one second entry, the second read including a step of interpreting the first entry recovered in the second data format on the basis of the second entry.

In a particular implementation, said history data characterizes payment transactions, e.g. of Europay Mastercard Visa (EMV) type.

In a particular implementation, the various steps of the processing method are determined by computer program instructions.

Consequently, the invention also provides a computer program on a data medium (or recording medium), the program being suitable for being performed by a terminal, or more generally by a computer, the program including instructions adapted to performing steps of a processing method as defined above.

The program may use any programming language, and be in the form of source code, object code, or code intermediate between source code and object code, such as in a partially compiled form, or in any other desirable form.

The invention also provides a computer-readable data medium (or recording medium), that includes instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides a terminal suitable for performing the terminal method of the invention. More particularly, the invention also provides a terminal comprising:
- a collection module configured to collect on-line, from a remote server, first history data representative of at least one transaction associated with a user account;
- a communication module configured to communicate contactlessly with a smart card to recover second history data stored locally in a memory of the smart card, said second history data being representative of at least one transaction processed by the smart card in association with the user account;
- an analysis module configured to aggregate the first history data with the second history data in order to obtain up-to-date history data; and
- a generation module configured to generate transaction-following data from the up-to-date history data.

It should be observed that the various implementations mentioned above with reference to the processing method of the invention and the associated advantages apply in analogous manner to the terminal of the invention.

In an embodiment, the invention is performed by means of software and/or hardware components. In this context, the term "module" may correspond in this document equally well to a software component or to a hardware component or to a combination of hardware and software components.

A software component corresponds to one or more computer programs, one or more subprograms of a program, or more generally to any program element or software suitable for performing a function or a set of functions, as described below for the module concerned. Such a software component may be executed by a data processor of a physical entity (terminal, smart card, etc.) and is capable of accessing the hardware resources of that physical entity (memories, storage media, communications buses, electronic input/output cards, user interfaces, etc.)

In the same manner, a hardware component corresponds to any hardware element or assembly of hardware elements suitable for performing function or a set of functions, in accordance with the description below of the module in question. It may be a programmable hardware component or it may include an integrated processor for executing software, e.g. an integrated circuit.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF IMPLEMENTATIONS

As mentioned above, the present invention relates to terminals and more particularly to using a terminal to consult data representative of transaction history, e.g. in the field of banking.

The invention proposes a processing method enabling a terminal to obtain history data that is reliable and up-to-date representing the state of a user account associated with a smart card that a user can use in order to carry out transactions.

For this purpose, the invention provides a processing method that is performed by a terminal, the method comprising the following steps: collecting on-line, from a remote server, first history data representative of at least one transaction associated with a user account; contactlessly communicating with a smart card, during which the terminal recovers second history data stored locally in a memory of the smart card, the second history data being representative of at least one transaction processed by the smart card in association with the user account; and analysis during which the terminal aggregates the first history data with the second history data in order to obtain up-to-date history data. The terminal can thus generate transaction-tracking data on the basis of history data that is up-to-date, the transaction-following data giving up-to-date information about the state of the user account.

The invention also relates to a terminal configured to perform such a processing method.

In the present disclosure, implementations of the invention are described in association with a terminal that is configured to collect transaction history data from a bank card of the Europay Mastercard Visa (EMV type). EMV is the standard protocol presently used most commonly in the world, in particular for making secure payment transactions carried out by smart cards.

Nevertheless, it should be observed that the invention is not limited exclusively to EMV transactions, but that it applies more generally to any terminal or electronic device configured to read history data stored in a smart card that uses the EMV protocol or any other transaction standard for carrying out any kind of transaction.

It should also be observed that the concept of a "transaction" is understood broadly herein and, by way of example, it includes authentication transactions, or in the field of banking, payment or transfer transactions.

Unless specified to the contrary, elements that are in common or analogous in more than one of the figures are given the same reference signs and present characteristics that are identical or analogous, so such common elements are generally not described again, for reasons of simplicity.

Figure 1:
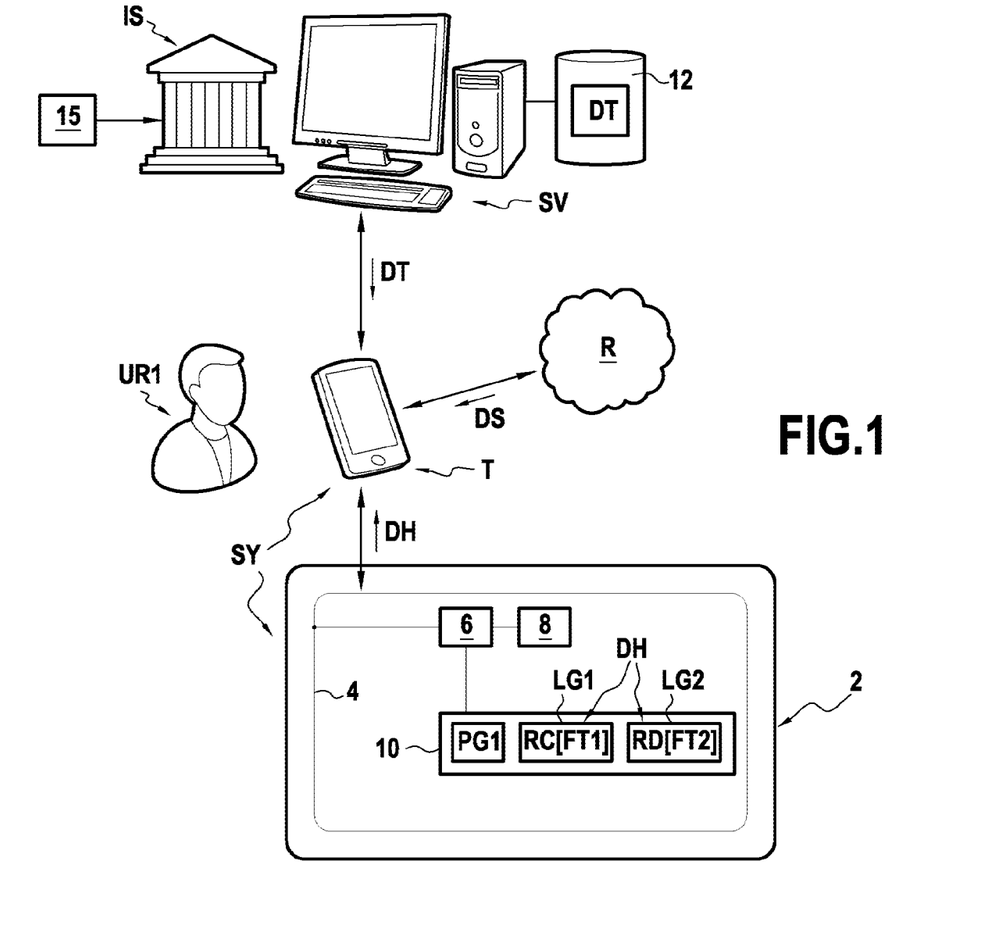
FIG. 1 is a diagram of an environment comprising a terminal suitable for co-operating with a smart card and with a remote server in a particular implementation of the invention.

FIG. 1 is a diagram of an environment comprising a smart card 2 of a user UR1, a terminal T, and a remote server SV. The terminal T is configured to communicate firstly with the remote server SV and secondly with the smart card 2.

As mentioned above, it is assumed herein that the smart card 2 is an EMV card, such as a payment card, for example. By way of example, the bank card 2 complies with the ISO 7816 standard. In the implementations described below, the bearer UR1 uses the bank card to carry out payment transactions.

More precisely, the smart card 2 has a radiofrequency (RF) antenna 4, a processor 6, a rewritable volatile memory (of the random access memory (RAM) type) 8, and a rewritable non-volatile memory 10 (e.g. of the flash type).

The processor 6 can process transactions by communicating in contactless mode with readers while using its RF antenna 4. In a variant, the smart card 2 also has external contacts (not shown) that the processor 6 can use for communicating by contact with readers in order to carry out transactions.

The processor 6 is likewise configured to communicate in contactless mode with the terminal T by using the RF antenna 4.

In this example, the non-volatile memory 10 constitutes a data medium (or recording medium) in accordance with a particular embodiment that is readable by the smart card 2 and that stores a computer program PG1 in accordance with a particular embodiment.

Still in the presently-considered example, the rewritable non-volatile memory 10 is configured to store log data (or history data) DH representative of transactions carried out by the smart card 2 over time, i.e. payment transactions in this example. In a particular example shown in FIG. 1, the memory 10 includes two log files for this purpose: a first log file (or primary log file) LG1 configured to store log data DH in a first data format FT1, and a second log file (or secondary log file) LG2 configured to store log data PH in a second data format FT2 that is different from the first format FT1. As explained below, the second data format FT2 is of smaller size (compressed) compared with the first data format FT1. Thus, the second format FT2 stores only some of the log data defined by the first data format FT1.

In this example, these first and second log files LG1, LG2 correspond to distinct memory zones.

Variant implementations that do not involve two such distinct log files LG1 and LG2 are nevertheless possible in the context of the invention. In a variant, all of the history data DH is stored locally in a single log file, either in a single format, or else in the above-mentioned formats FT1 and FT2.

The log files LG1 and LG2 shown in FIG. 1 are described in greater detail below, with reference in particular to FIGS. 5A-5B, in a particular implementation.

By way of example, the smart card 2 is configured to process a current transaction with any terminal and to store new log data DH representative of a current transaction in the first log file LG1 in the first data format FT1, and if necessary to transfer stored old log data from the first log file LG1 to the second log file LG2 so that it is backed up therein in the second data format FT2. By way of example, this back-up mechanism in the second log file LG2 may be triggered by the smart card 2 if the forthcoming storage of new log data DH in the first file LG1 in the first format FT1 is considered as critical for old log data stored in the first log file LG1.

In general manner, the smart card 2 can apply various criteria based on at least one predefined condition in order to determine whether old log data present in the first log file LG1 could be subjected to a back-up transfer into the file LG2 using the format FT2.

By way of example, if, prior to storing new log data DH of a current transaction in the first format FT1 in the first log file LG1, the smart card 2 detects that such storage satisfies at least one predetermined condition indicating that it is critical relative to old log data already stored in the first log file LG1 in the first format FT1, then the card transfers that old log data into the second log file LG2 so that it can be stored therein in the smaller format FT2. This transfer avoids an immediate or future risk of the old log data becoming lost as a result of new log data DH being stored in the first log file LG1 in the first format FT1.

As mentioned above, various decision criteria may be applied by the smart card 2 in order to determine whether such a back-up mechanism is to be triggered. The way in which the smart card 2 takes this decision may be adapted depending on circumstances by the person skilled in the art, and is not described in greater detail in this document.

Furthermore, the remote server SV in this example is managed by a third entity (a bank in this example), written IS, that is also the issuer of the bank card 2, although other variants are possible. In this example, the bank IS manages a bank account 15 of the user UR1. In general manner, the bank account 15 constitutes a user account in the meaning of the invention, with the state of that account being characterized by history data DT, also referred to as account data. The account data DT is representative of at least one transaction carried out in association with the user account 15 by means of the bank card 2 or by any other appropriate means (Internet transaction, checks, . . . ). In this example, the transactions are bank transactions, such as payment transactions or bank transfers, for example.

The bank IS stores this account data DT in a database 12 that is accessible to the remote server SV.

The terminal T is configured to interrogate the remote server SV in order to recover account data DT stored in the database 12. Furthermore, the terminal T can be used for recovering history data DH stored locally in the memory 10 of the smart card 2.

The terminal T may be any electronic device capable of performing the method of the invention as described in this document, such as for example a computer, a smartphone, or a tablet.

In particular, the terminal T is configured to communicate with the remote server SV, e.g. via a network such as the Internet, to recover account data DT, and to communicate in contactless mode with the smart card 2 in order to recover history data DH.

In a particular example, the terminal T is configured also to receive SMS messages from a telephone network R using the 3-D Secure (3DS) payment protocol, these messages constituting third history data representative of at least one transaction carried out in association with the user account 15.

Figure 2:
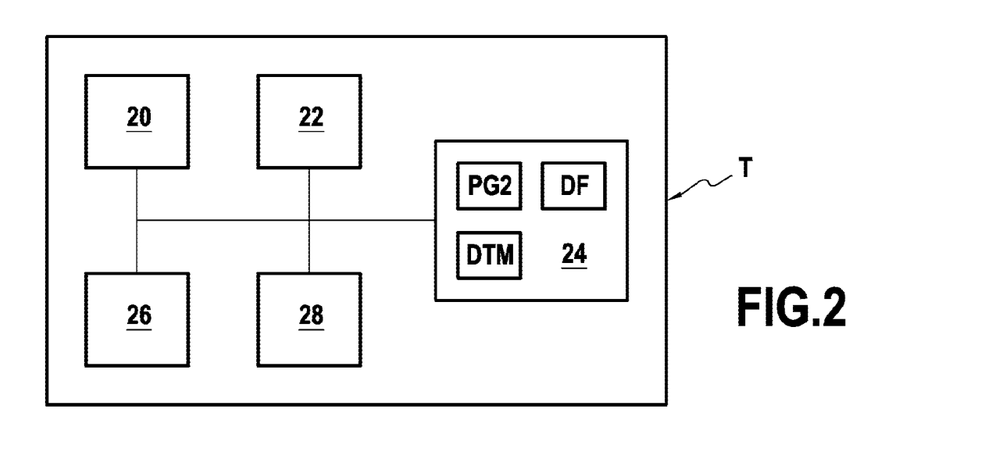
FIG. 2 is a diagram of the structure of a terminal, in a particular embodiment of the invention.

FIG. 2 is a diagram showing the structure of a particular embodiment of the terminal T shown in FIG. 1.

More precisely, the terminal T in this example comprises a processor 20, a rewritable volatile memory 22 (of RAM type), a rewritable non-volatile memory 24 (e.g. of flash type), a first communication interface 26, and a second communication interface 28.

In this example, the non-volatile memory 24 constitutes a data medium (or recording medium) in accordance with a particular embodiment that is readable by the terminal T and that stores a computer program PG2 in accordance with a particular embodiment. The computer program PG2 includes instructions for executing steps of a processing method in a particular implementation. The steps of the method are described below, in particular implementations of the invention.

The non-volatile memory 24 can also store various kinds of data involved when performing the processing method, in particular up-to-date history data DTM obtained from the account data DT and the history data DH, or indeed transaction-following data DF. The nature of this data and the way it is used are described in detail below.

In this example, the terminal T also has two communication interfaces 26 and 28.

The first communication interface 26 serves in this example to enable the terminal T to communicate contactlessly with the smart card 2. By way of example, this may be done in its compliance with the near-field communication (NFC) standard. To do this, the first communication interface 26 may include in particular an RF antenna and a transceiver. The way in which such a terminal communicates in contactless mode with an EMV smart card is itself known, and is therefore not described in detail in this document.

The second communication interface 28 enables the terminal T to communicate with the remote server SV in order to recover the account data DT. By way of example, this communication takes place via a communications network, such as the Internet or some other network.

It should be observed that certain elements that are also present in a terminal or in an EMV smart card are voluntarily omitted since they are not necessary for understanding the present invention. It should also be observed that the terminal T shown in FIGS. 1 and 2 constitutes merely an example, with other embodiments being possible in the context of the invention. In particular, the person skilled in the art understands that certain elements of the terminal are not described in this document in order to facilitate understanding the invention, since those elements are not needed for performing the invention.

Figure 3:
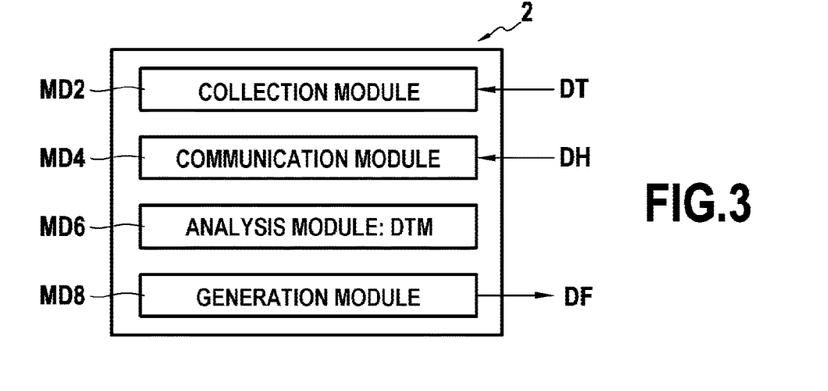
FIG. 3 is a diagram of functional modules implemented by a terminal in a particular implementation of the invention.

Still with reference to the terminal T, the processor 20 controlled by the computer program PG2 implements a certain number of modules as shown in FIG. 3, namely: a collection module MD2; a communication module MD4; an analysis module MD6; and optionally a generation module MD8.

As shown in FIGS. 1 to 3, the collection module MD2 in this example is configured to collect on-line from the remote server SV first history data DT referred to as account data and representative of at least one transaction carried out in association with the user account 15.

The communication module MD4 is configured to communicate contactlessly with the smart card 2 in order to recover history data DH stored locally in the memory 10 of the smart card, which history data DH is representative of at least one transaction processed by the smart card 2 in association with the user account 15.

The analysis module MD6 is configured to aggregate the account data DT obtained by the collection module MD2 with the history data DH obtained by the communication module MD so as to obtain up-to-date history data DTM that is representative of transactions carried out in association with the user account 15.

The generation module MD8 is configured to generate transaction-following data DF from the up-to-date history data DTM. The transaction-following data DF is representative of the state of the user account 15 and may in particular comprise an up-to-date balance of the account or an up-to-date list of transactions, as described below.

The configuration and the operation of the modules MD2 to MD8 of the terminal T appear in greater detail from the implementations described. Nevertheless, it should be understood that the modules MD2 to MD8 as shown in FIG. 3 constitute merely a non-limiting embodiment of the invention.

Figure 4:
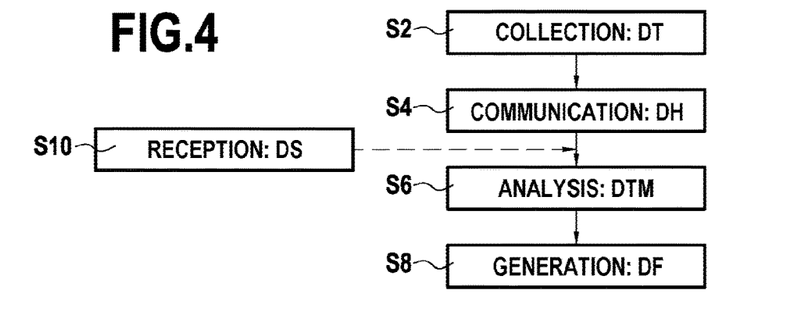
FIG. 4 is a flow chart showing the steps of a processing method in a particular implementation of the invention.

FIG. 4 shows the steps performed by the terminal T as illustrated in FIGS. 1 to 3 during a processing method in accordance with a particular implementation of the invention. For this purpose, the terminal T performs the processing method by executing the program PG1.

It is assumed that the user UR1 has performed EMV payment transactions using the smart card 2 and now desires to consult the dynamic balance of the user account 15. It is assumed that, at this stage, certain recent transactions carried out by means of the smart card 2 have not yet been taken into account by the bank IS in the account data DT representing the state of the account 15.

During a collection step S2, the terminal collects first history data DT on-line from the remote server SV, which data is referred to as account data and is representative of at least one transaction associated with the user account 15. For this purpose, the terminal T communicates with the remote server SV so that it interrogates its database 12 and returns the pertinent account data DT. Each transaction specified in the account data DT may have been carried out by using the smart card 2 or via other appropriate means associated with the user account 15.

During a communication step S4, the terminal T communicates contactlessly with the smart card 2, e.g. by the terminal T being in the proximity of the smart card 2. During this contactless communication, the terminal T recovers the history data DH stored locally in the memory 10 of the smart card 2, which history data is representative of at least one transaction processed by the smart card 2 in association with the user account 15.

Thereafter, during an analysis step S6, the terminal T aggregates (or combines) the account data DT with the history data DH in order to obtain up-to-date history data DTM. It is assumed herein that the account data DT obtained in S2 and the history data DH obtained in S4 differ as a result of recent transactions that have been carried out by means of the smart card 2 and that have not yet been taken into account by the bank IS. In other words, and by way of example, the history data DH specifies at least one transaction that has been carried out by the smart card 2 and that is not specified in the account data DT.

During this analysis step S6, the terminal T may for example: compare the account data DT collected on-line (S2) with the history data DH recovered during the contactless communication S4 in order to detect at least one new transaction in the history data DH that is not specified in the account data DT, and then combine the history data for said at least one new transaction with the account data DT so as to obtain up-to-date history data DTM.

Where appropriate, the terminal T may also generate (S8) transaction-following data DF from the up-to-date history data DTM obtained in S6. In this example, the transaction-following data is representative of a current state of the user account 15. The transaction-following data may comprise some or all of the up-to-date history data DTM (e.g. an up-to-date list of transactions carried out in association with the account 15, or indeed an up-to-date indicator such as the current balance of the user account 15.

The invention serves advantageously to enable the user of a bank card, and more generally of a smart card, to obtain reliable and up-to-date information about the state of a user account associated with that card. In particular, the user can act in real time to follow the state of a bank account associated with a bank card. This real-time following is possible since the account data collected on-line is updated from recent transactions carried out using the user's smart card. On-line consultation of the state of the account, e.g. via an Internet portal, cannot on its own obtain information about the current state of the account if recent transactions processed by the smart card have not yet been taken into account by the bank.

The invention thus enables the user to obtain a real-time balance of the account 15 or to obtain an up-to-date list of recent transactions carried out in association with the account 15. Obtaining such a list enables the user in particular to detect whether two successive transactions have been carried out in error in association with the account during a purchase using the bank card, for example.

It should be observed that in the example shown in FIG. 1, the log data DH is stored in two distinct log files LG1 and LG2 in two distinct data formats FT1 and FT2, where the format FT2 is a compressed format (i.e. of smaller size) compared with the format FT1. Nevertheless, the invention can also apply when all of the log data DH recovered during S4 (FIG. 4) by the terminal T is stored locally in a single log file, in one or more distinct data formats.

Furthermore, it is possible during S4 (FIG. 4) to cause the terminal to communicate with a plurality of smart cards of the user in order to take account of transactions carried out by a plurality of cards associated with a single account.

In a particular implementation, during the communication step S4 (FIG. 4), the terminal T interrogates the smart card 2 so as to recover only history data DH that satisfies a predetermined time condition. Each transaction corresponding to the history data DH recovered during S4 may for example be characterized in time by an instant later than a predetermined fixed instant. In other example, each transaction corresponding to the history data DH recovered in S4 is characterized by an instant that lies in a time period of predetermined duration that terminates at a current instant during which the processing method of the invention is performed.

The term "instant" is used in this document to designate a date and/or a time, or more generally, any indication concerning a position in time (a time indication). It is assumed that each transaction under consideration in this document is carried out at a given instant t that is defined in the corresponding history data. The current instant in the meaning of the invention is defined as being an instant during which the method of the invention is performed, with the way in which this current instant is determined by the terminal being freely selectable by the person skilled in the art. In a particular example, the terminal T uses an internal clock or receives a time and/or date indication from the outside.

Taking a time condition into account as described above serves advantageously to enable the terminal to limit the volume of history data recovered during the communication step S4, thereby accelerating the process and reducing the resources required in the terminal T and the smart card 2. The terminal T can thus recover only the pertinent portion of the history data DH, i.e. the data corresponding to the most recent transactions that might not yet be taken into account at this stage in the account data DT for the user account 15. By way of example, during S4, the terminal T recovers all of the history data DH corresponding to transactions carried out during the current calendar month or over a moving period having a duration of one month and that terminates on the current date.

Examples of how such a time condition is taken into account during the communication step S4 are described in greater detail below.

As shown in FIG. 4, in a particular implementation, the terminal T also receives (S10) history data DS, referred to as third history data, by means of at least one SMS message. These SMS messages are received using the 3DS protocol known to the person skilled in the art. Each SMS message may comprise history data characterizing at least one transaction carried out by the user UR1 in association with the user's account 15. During the analysis step S6, the account data DT is updated both from the second history data DH coming from the smart card 2 and also from the third history data DS obtained via the 3DS mechanism.

This variant makes it possible during S6 to obtain up-to-date history data DTM that is more complete insofar as it also takes account of transactions carried out using the 3DS mechanism (e.g. during a remote payment transaction over the Internet or some other network). This makes it possible to obtain even more reliable information about the state of the account 15 of the user UR1.

A processing method in accordance with a particular implementation is described below with reference to FIGS. 5A-5B, 6A-6B, 8A-8B, and 9. More particularly, the terminal T shown in FIGS. 1-3 executes the computer program PG2 in order to perform the processing method in a particular implementation.

Figure 5A:
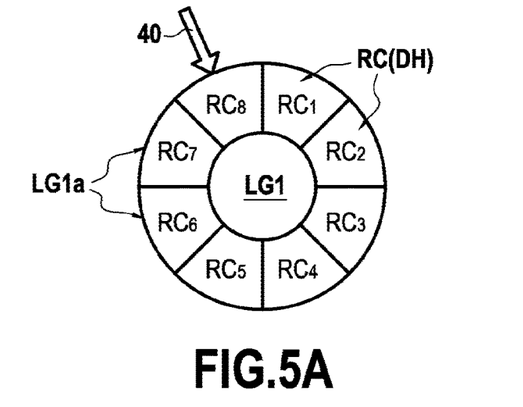
FIGS. 5A and 5B are diagrams showing a first log file and a second log file, in a particular implementation of the invention.
Figure 5B:
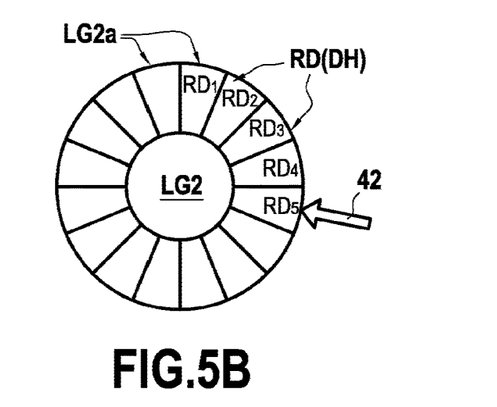

FIGS. 5A and 5B are views diagrammatically representing the above-mentioned log files LG1 and LG2. In this example, the first log file LG1 and the second log file LG2 both have a respective predefined number of locations (or memory zones), with each of these locations being dedicated to storing one entry constituted by history data DH representative of a single transaction processed by the smart card 2.

More precisely, it is assumed herein that the first log file LG1 has eight memory zones LG1a, each of which is configured to store one respective entry RC. FIG. 5A shows an example in which the eight zones LG1a contain respective entries written RC1 to RC8. Each entry RC comprises history data DH complying with the first data format FT1.

Likewise, it is also assumed that the second log file LG2 has sixteen memory zones LG2a, each of which is configured to store one respective entry RD. FIG. 5B shows an example where only five of the sixteen available zones LG2a contain a respective entry written RD1 to RD5. Each entry RD in the second log file LG2 thus comprises history data DH in compliance with the second data format FT2.

It is possible for the organizations and the representations of the first and second log files LG1 and LG2 to be different.

As specified below, counters 40 and 42 are symbolized in FIGS. 5A and 5B to represent the current read position in the respective log files LG1 and LG2. The terminal T is suitable for specifying to the smart card 2 a specific entry RC or RD that it desires to read from among the various available zones LG1a, LG2a.

Furthermore, and as already mentioned, the second data format FT2 is a compressed format, i.e. of size that is smaller than the first data format FT1. It follows that the second format FT2 allows a smaller quantity of data to be stored than the first format FT1. In this example, the second format FT2 can store only some of the log data defined by the first data format FT1.

Figure 6A:
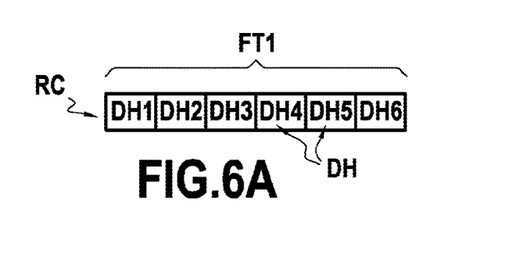
FIGS. 6A and 6B are diagrams showing log data respectively in accordance with a first data format and in accordance with a second data format, in a particular implementation of the invention.
Figure 6B:
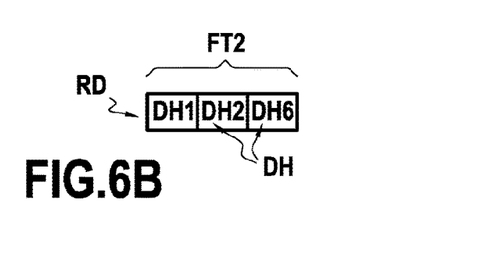

FIGS. 6A and 6B are diagrams showing the log data DH in compliance with the data formats FT1 and FT2 respectively.

More precisely, FIG. 6A shows an entry RC of the first log file LG1, this entry RC comprising a plurality of log data items referenced DH1 to DH6 all characterizing a single transaction processed by the smart card 2. It is assumed that each data item DH1 to DH6 is characterized by a value and corresponds to a distinct type of log data. By way of example, these data items DH1 to DH6 may comprise at least one of the following data types:
  the instant (e.g. a date and/or a time) at which the transaction was processed;
  the currency of the transaction;
  the amount of the transaction;
  at least one predefined cryptogram;
  safety checks carried out by the smart card 2 while processing the transaction;
  the results of the safety checks; and
  the result (or status) of the transaction (accepted, refused, . . . ).

In a particular example, the data types provided by the first data format FT1 are defined by the applicable Visa or Mastercard standard.

In one particular example, the first data format FT1 (or log format) complies with the following standard for a common payment application (CPA) product: "EMV integrated circuit card, specifications for payment systems, common payment application specification", Version 1.0 December 2005.

Nevertheless, the person skilled in the art can adapt in particular the number and the nature of the data types included in the FT1 format as required.

In addition, FIG. 6B shows an entry RD in the second log file LG2, characterizing a transaction processed by the smart card 2. This entry RD has only one or some of the data items DH1-DH6 defined by the first format FT1. In this example, an entry RD in compliance with the second format FT2 contains the data types DH1, DH2, and DH6, but does not contain the data types DH3, DH4, and DH5 specified for the first format FT1. As mentioned above, each data type DH1, DH2, DH6 corresponds to a characteristic of the transaction in question and presents a particular value.

In general manner, and by way of example, the first data format FT1 defines a plurality of data types (e.g. DH1-DH6), while the second data format FT2 defines a selection (e.g. DH1, DH2, DH6) from among said plurality of data types, excluding at least one of the data types in said plurality. It is assumed herein that the log data of each entry stored in the second format FT2 in the second log file LG2 has the same selection of data types DH1, DH2, and DH6, even though other implementations are possible.

In this example, it is assumed that the data type DH1 in the entries RC and RD characterize the instant at which the corresponding transaction took place.

Figure 7:
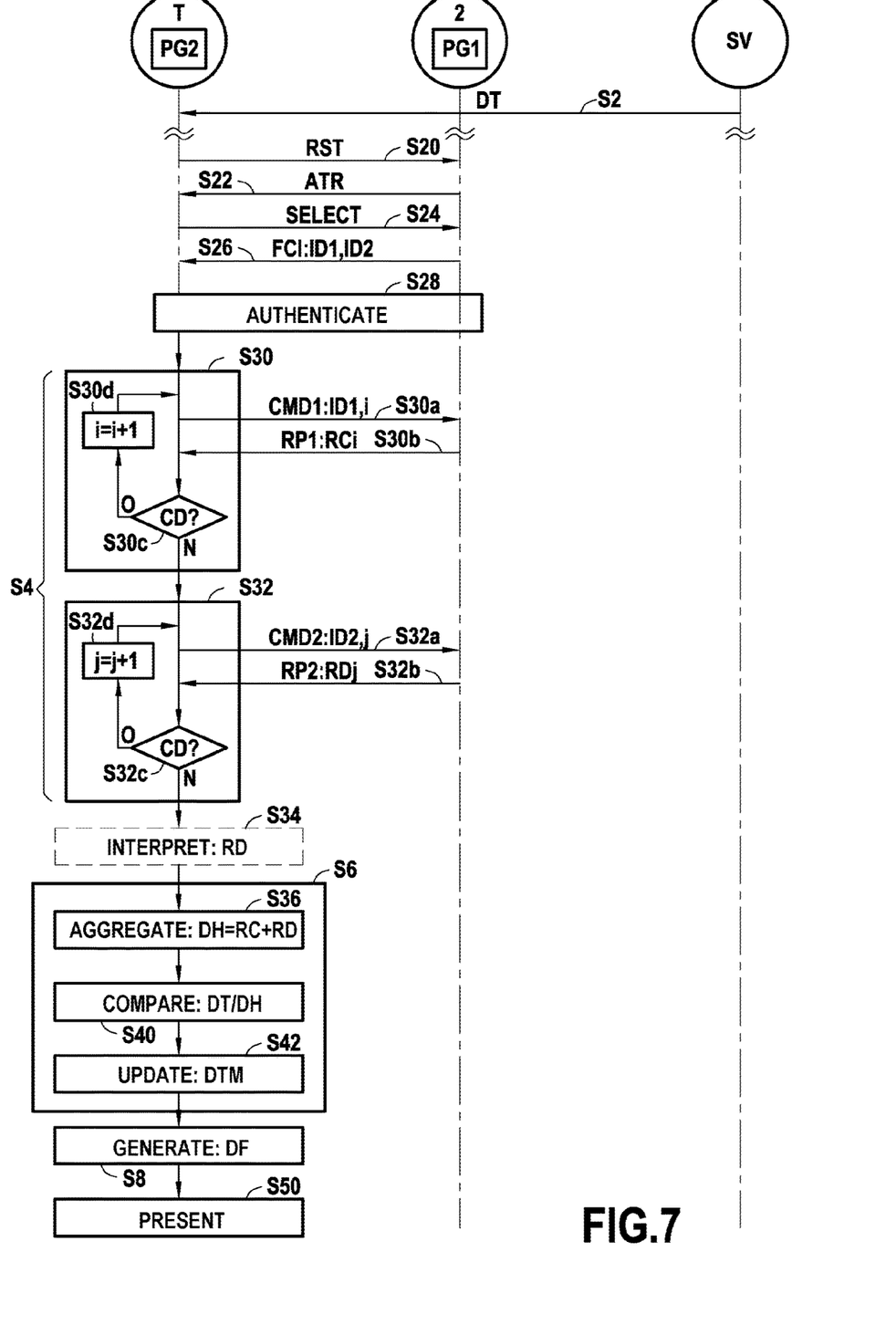
FIG. 7 is a flow chart showing the steps of a processing method in a particular implementation of the invention.

There follows a description of the steps performed by the terminal T in co-operation with the smart card 2 and the remote server SV in order to perform the processing method in a particular implementation as shown in FIG. 7.

During a reception step S2 identical to that described above with reference to FIG. 4, the terminal T collects on-line, from the remote server SV, first history data DT, referred to as account data, representative of at least one transaction carried out in association with the user account 15. This account data DT may specify transactions carried out using the smart card 2 and/or other means.

Furthermore, the terminal T proceeds with a step S4 of contactless communication with the smart card 2, as described above. For this purpose, the terminal T performs steps S20 to S32 as described below. By way of example, this communication S4 is initiated by placing the smart card 2 in the detection field of the contactless interface 26 of the terminal T.

In this example, the terminal T communicates with the smart card 2 using the EMV protocol in order to read the history data DH stored locally in the smart card 2, i.e. in the log files LG1 and LG2. For this purpose, the terminal T and the smart card 2 exchange APDU commands as specified by the EMV standard.

More specifically, the terminal sends (S20) to the smart card 2 a reset command (RST), and in response it receives (S22) an answer to reset (ATR) command. Thereafter, the terminal T sends (S24) a SELECT command to the smart card 2, and in response it receives (S26) a file control information (FCI) message including an identifier ID1 of the first log file LG1 and an identifier ID2 of the second log file LG2. These identifiers ID1 and ID2 are supplied in order to enable the terminal T to read the contents of the corresponding files LG1 and LG2.

The terminal may optionally perform an authentication step S28 with the card C in order to enable the card to verify that the terminal T is indeed entitled to interrogate it.

Thereafter, the terminal T performs a first read S30 during which it consults the first log file LG1 of the smart card 2 in order to discover history data DH stored in the first data format FT1. The terminal T also performs a second read S32 during which it consults the second log file LG2 of the smart card 2 in order to recover history data DH stored in the second data format FT2, the format FT2 being smaller in size than the first data format FT1, as mentioned above. Various implementations are possible.

During the first and second reads S30 and S32, it is assumed that the terminal reads each entry RC, RD in the respective log files LG1 and LG2 one by one so long as the entry it reads corresponds to a transaction that complies with a predetermined time condition, so that the history data DH recovered during S4 satisfies the predetermined time condition.

More precisely, during the first read S30, the terminal T sends (S30a) to the smart card 2 a read command CMD1 including the identifier ID1 of the first log file LG1 and an identifier (or index) i corresponding to the entry RCi that the terminal T seeks to read in the file LG1, where i is an integer in the range 1 to 8 in this example. In response, the pointer 40 (FIG. 5A) is positioned to correspond with the entry $RC_i$ in the first log file LG1 and the terminal T receives (S30b) the requested entry $RC_i$. The initial value of the identifier i may be selected in any appropriate manner by the terminal T. In a particular example, when the first read S30 is initiated, the read counter 40 of the first log file LG is set to correspond with the most recent entry, e.g. the entry RC1, but other implementations are nevertheless possible.

Once this entry RCi has been obtained (S30b), the terminal T determines (S30c) whether it satisfies a predetermined time condition CD. To do this, and by way of example, the terminal T consults the log data item DH1 in the entry RCi that characterizes the instant at which the transaction in question was carried out. Examples of a time condition CD are described in greater detail below with reference to FIGS. 8A and 8B. If the time condition CD is satisfied (S30c), the terminal T detects that the first read S30 should continue and consequently proceeds to step S30d. Otherwise, the first read S30 terminates and the method continues with the second read S32.

During the step S30d, the terminal T increments the identifier i (or in a variant decrements it), and then reiterates the steps S30a-30c in order to read the entry RCi+1 (or RCi−1) in the first log file LG1. The first read S30 is thus performed by successive incrementing (or decrementing) starting from an initial entry RC, e.g. the most recent entry or the oldest entry.

The terminal T thus reads each entry RC one by one in the first log file LG1 so long as the entry RC read in S30a-S30b corresponds to a transaction corresponding to the time condition CD. If during S30b the terminal T receives an error message, it deduces that the requested entry RC does not exist in the first log file LG1 and thus terminates the first read S30 so as to pass on to the second read S32.

The terminal T performs the second read S32 in analogous manner to the first read S30. More precisely, during the second read S32, the terminal T sends (S32a) to the smart card 2 a read command CMD2 including the identifier ID2 of the second log file LG2 together with an identifier (or index) j corresponding to the entry $RD_j$ that the terminal T seeks to read in the file LG2, where j is an integer in the range 1 to 16 in this example. In response, the pointer 42 (FIG. 5B) is positioned to correspond with the entry $RD_j$ in the second log file LG2 and the terminal T receives (S32b) the requested entry $RD_j$. The initial value of the identifier j may be selected in any appropriate manner by the terminal T. In a particular example, when the second read S32 is initiated, the read counter 42 of the first log file LG is set to correspond with the most recent entry, e.g. the entry RD1, but other implementations are nevertheless possible.

Once this entry RDj has been obtained (S32b), the terminal T determines (S32c) whether it satisfies a predetermined time condition CD. To do this, and by way of example, the terminal T consults the log data DH1 of the entry RDj that characterizes the instant at which the transaction in question was carried out. It is assumed in this example that this time condition CD is identical to that used in step S30c during the first read S30, however variants are possible. If the time condition CD is satisfied (S32c), the terminal T detects that the second read S32 needs to continue and consequently proceeds to step S32d. Otherwise, the second read S32 terminates and the terminal proceeds with analysis step S6.

During step S32d, the terminal T increments the identifier j (or in a variant decrements it) and then reiterates the steps S32a-32c in order to read the input RCj+1 (or RCj−1) in the second log file LG2. The second read S32 is thus performed by successively incrementing (or decrementing) from an initial entry RC, e.g. the most recent entry or the entry that is the oldest.

The terminal T thus reads each entry RD one by one in the second log file LG2 so long as the entry RD read during S32a-S32b corresponds to a transaction that satisfies the time condition CD. If the terminal T receives an error message during S32b, it deduces that the requested entry RD does not exist in the second log file LG2, and thus terminates the first read S30 by passing on to the analysis step S6.

As mentioned above, taking a time condition CD into account during the first and second reads S30 and S32 serves advantageously to enable the terminal to limit the volume of history data it recovers during the communication step S4, thereby accelerating the reading process and reducing the resources required in the terminal T and the smart card 2. The terminal T can thus recover only pertinent data from the history data DH, i.e. data corresponding to the most recent transactions that might not yet have been taken into account at this stage in the account data DT of the user account 15. By way of example, during S4, the terminal T recovers all of the history data DH corresponding to transactions carried out during the current calendar month or during a moving period of one month terminating at the current date.

Still with reference to FIG. 7, the terminal T then performs an analysis step S6 as described above with reference to FIG. 4. In a variant described below, an interpretation step S34 is performed before the analysis step S6.

More precisely, during the analysis step S6, the terminal T aggregates (or combines) during S36 the pertinent log data DH of the smart card 2 from the entries RC and RD it has read (S4) in the files LG1 and LG2. In this example, all of the entries as grouped together in this way in S36 satisfy the time condition CD.

Thereafter, the terminal T compares (S40) the history data DH of the smart card 2 as obtained during S36 with the account data DT as obtained during S2. This comparison serves to identify differences between the log data DH from the smart card 2 and the account data DT.

During an updating step S42, the terminal T then updates the account data DT on the basis of the comparison performed during S40, so as to obtain up-to-date history data DTM.

In particular, during S40, the terminal T can determine whether at least one entry RC and/or RD read from the smart card 2 corresponds to a new transaction that is not specified in the account data DT coming from the remote server SV. If so, the terminal T updates (S42) the account data DT by adding thereto the history data DH (entries RC and/or RD)

from the smart card 2 and corresponding to each new transaction as identified in this way.

Once the analysis step S6 has been completed, the terminal T may act during a generation step S8 to generate transaction-following data DF as described above with reference to FIG. 4. For this purpose, the terminal T may perform any appropriate processing on the basis of the up-to-date history data DTM. The transaction-following data DF is representative of the current state of the user account 15. In a particular example, this transaction-following data DTM corresponds to a current balance of the user account 15. The balance is obtained by adding the amounts of recent transactions to an old balance specified in the account data DT. In a particular example, the transaction-following data DF comprises an up-to-date list of transactions performed over a given time period in association with the account 15.

Furthermore, in the example described above with reference to FIG. 7, it is assumed that each entry RD stored in the second format FT2 in the second log file LG2 has the same selection of data types DH1, DH2, and DH6. Nevertheless, other examples can be envisaged. In particular, as mentioned above and by way of example, the entries RD for storing in the second log file LG2 in the second data format FT2 may contain varying selections of data types from the types DH1-DH6 provided by the format FT1.

In a particular example, each entry RDi in the file LG2 comprises, for example, a selection of at least one data type (from among DH1-DH6) that is a function of the content of the preceding entry RDi−1 (or RDi+1) representing a preceding transaction. In other words, at least one entry RD in the second log file LG2 may be coded on the basis of the content of the immediately preceding (or adjacent) entry RD or on the basis of some preceding entry RD (not necessarily adjacent). Under such circumstances, the second read S32 (FIG. 7) of the entries RD in the second log file LG2 requires an interpretation step performed in compliance with pre-defined coding rules in order to deduce the content of the entry RDi on the basis of the content of a preceding entry (e.g. RDi−1 or RDi+1).

Figure 10A:
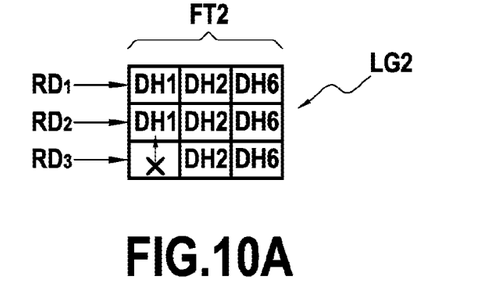
FIGS. 10A and 10B are diagrams showing the contents of entries in a second log file in a second data format in accordance with particular implementations of the invention.
Figure 10B:
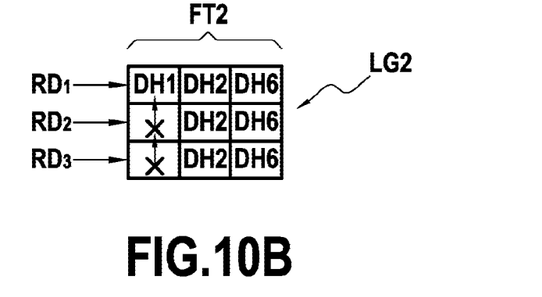

In a particular example, the compressed format coding FT2 is such that a data entry RDi in the log file LG2 contains a predefined data type (e.g. $DH_1$) only if the most recent entry RD ($RDRD_{i-1}$ or $RD_{i-2}$) prior to the entry $RD_i$ and including the predefined data type specifies, for that predefined data type, a value that is different from the value for the transaction corresponding to the entry $RD_i$. For example, and as shown in FIG. 10A, the entry $RD_3$ in the log file LG2 does not contain the data type DH1 (e.g. the instant at which the transaction took place or the currency used in the transaction) if the immediately preceding entry $RD_2$ specifies the same value for that data type DH1 (same date, same currency, . . . ) as for the entry $RD_3$. In the same manner, and as shown in FIG. 10B, the entry $RD_3$ in the log file LG2 does not contain the data type DH1 if the immediately preceding entry $RD_2$ does not contain the data type DH1 and the still earlier entry $RD_1$ specifies for this data type DH1 the same value as for the entry $RD_3$, and so on. In order to interpret the value of a data type that is not present in the entry RD stored in the second format FT2 in the file LG2, it is consequently necessary to refer to the nearest earlier entry in time that includes this data type. For example, in FIG. 10B, the entries RD2 and RD3 therefore need to be interpreted as having the same value as the entry RD1 for the data type DH1. Other implementations are possible depending on the organization selected for storing the entries RD in the second log file LG2.

In general manner, the second log file LG2 may comprise at least one first entry RD corresponding to a first transaction, and at least one earlier second entry RD corresponding to a second transaction earlier than the first transaction, the first entry RD being encoded in the second data format FT2 on the basis of the content of said at least one second entry RD, the second read S32 being followed by a step S34 of interpreting the first entry RD recovered in the second data format FT2 on the basis of said second entry RD (FIG. 7).

By storing a data type in the second log file LG2 for a transaction only when the corresponding value differs from a preceding transaction, it is possible to save even more memory space in the smart card 2 without losing useful information. Since a plurality of successive transactions often present characteristics in common (same date, same currency, . . . ), this avoids storing redundant information in the secondary log file LG2 of the smart card 2. An entry stored in the second log file LG2 can be interpreted from the immediately preceding entry, or from some other preceding entry, in that file LG2.

In particular, when the log data types in the second log file LG2 are likely to vary, it is advantageous to include a field (not shown in the figures) in each entry RD to indicate which data types are included (e.g. in a header of the entry).

Furthermore, as already mentioned, the time condition CD applied during the first and second reads S30, S32 (FIG. 7), or more generally during the communication step S4 (FIG. 4), may be adapted depending on circumstances.

Figure 8A:
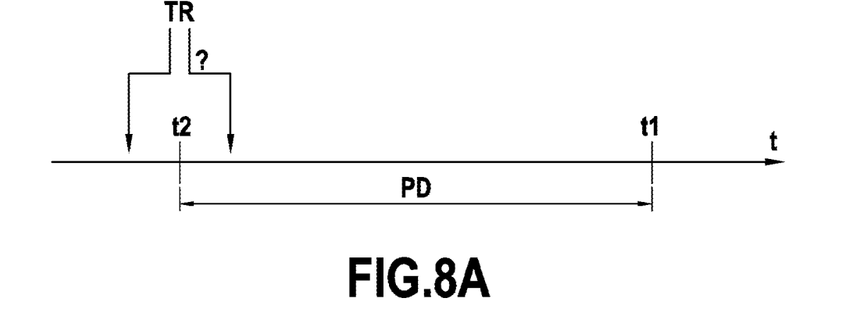
FIGS. 8A and 8B are diagrams showing how it is verified whether a time condition is satisfied, in particular implementations.

FIG. 8A shows this time condition CD being performed in a first implementation. In this example, the instant t1 designates a current instant during which the processing method is performed by the terminal T. More precisely, the terminal T detects (S30c, S32c) that the history data DH read in the smart card 2 satisfies the time condition CD if the history data DH is representative of a transaction TR performed at an instant later than a predetermined fixed instant t2. By way of example, this instant t2 may be defined by a date and/or a time (e.g. the first day of a calendar month).

Figure 8B:
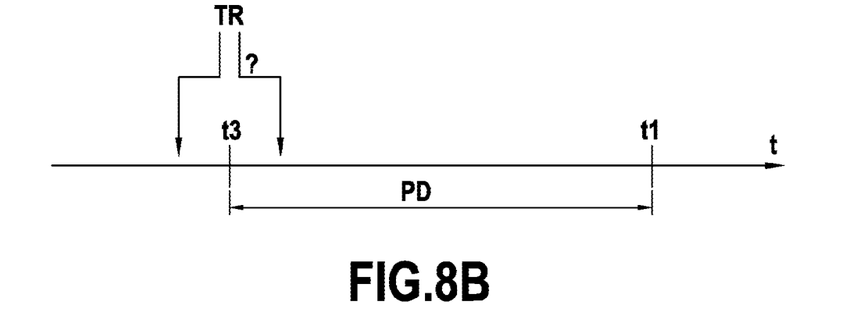

FIG. 8B shows the time condition CD being performed in a second implementation. In this example, the instant t1 designates a current instant during which the processing method, or more particularly the communication step S4, is performed by the terminal T. More precisely, the terminal T detects (S30c, S32c) that the history data DH read in the smart card 2 satisfies the time condition CD if the history data DH is representative of a transaction TR performed at an instant lying in a time period PD of predefined duration, terminating at the current instant t1.

This period PD constitutes a moving time window with its end bound being defined by the current instant t1 and with its predefined duration being selected in appropriate manner depending on circumstances (e.g.: a period of 1 month).

Figure 9:
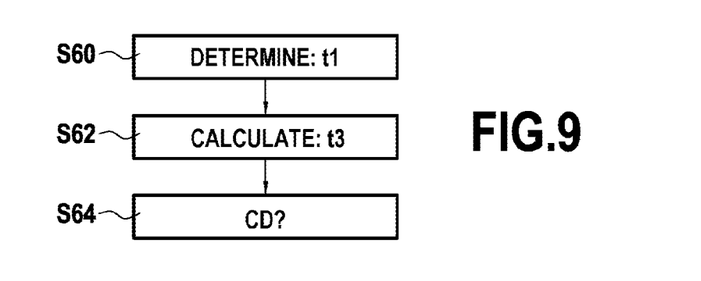
FIG. 9 is a flow chart showing the steps of a processing method in a particular implementation of the invention.

FIG. 9 shows a particular example of the verification performed by the terminal T in S30c and S32c (FIG. 7) to determine whether the time condition CD as defined above with reference to FIG. 8B is satisfied.

During a determination step S60, the terminal T determines the current instant t1. To do this, the terminal T1 consults an internal clock or receives a time indication from the remote server SV, for example.

Thereafter, the terminal T calculates (S62) an instant t3 (FIG. 8B) that is earlier in time than the current instant t1, this instant t3 corresponding to the beginning of the predefined time period PD. The calculation S62 is performed on the basis of the value for the current instant t1 and from the predefined duration given to the predefined time period PD (t3=t1−PD).

The terminal T detects (S64) that the transaction TR in question was carried out in the moving time period PD if the corresponding history data DH indicates that the transaction took place at an instant later than the instant t3.

It should also be observed that the order in which the steps of the processing method as described above with reference in particular to FIGS. 4 and 7 is performed constitutes merely an example, with other variants being possible. In particular, it is possible to perform the collection step S2 after the communication step S4 (FIGS. 4 and 7), or indeed to perform the second read S32 before the first read S30 (FIG. 7).

A person skilled in the art understands that the above-described implementations and variants merely constitute non-limiting examples of the invention. In particular, the person skilled in the art can envisage any adaptation or combination of the above-described implementations and variants in order to satisfy a particular need.

The invention claimed is:

1. A processing method performed by a terminal, said method comprising:
    collecting, by the terminal, on-line, from a remote server, first history data representative of at least one bank transaction associated with a user account;
    communicating, by the terminal, contactlessly with a smart card, during which the terminal recovers second history data stored locally in a memory of the smart card, said second history data being representative of at least one EMV payment transaction processed by the smart card in association with the user account, wherein said smart card is an EMV payment card;
    analyzing, by the terminal, to aggregate the first history data with the second history data in order to obtain up-to-date history data; and
    generating, by the terminal, based on the up-to-date history data, transaction-following data giving up-to-date information about the state of the user account,
    wherein the communicating comprises:
        a first read during which the terminal consults a first log file stored in a first memory zone in the smart card in order to recover second history data stored in a first data format; and
        a second read during which the terminal consults a second log file stored in a second memory zone, distinct from said first memory zone, in the smart card in order to recover second history data stored in a second data format that is compressed in size compared with the first data format;
    wherein each entry of the first log file comprises a plurality of log data items of distinct data types in accordance with the first data format for characterizing a payment transaction processed by the smart card, and wherein each entry of the second log file comprises a selection, from among the log data items, excluding at least one of said data types.

2. The method according to claim 1, wherein the analyzing comprises:
    comparing, by the terminal, the first history data collected on-line with the second history data recovered during the communication step in order to detect at least one new transaction in the second history data that is not included in the first transaction data; and
    aggregating, by the terminal, the history data of said at least one new transaction with the first history data so as to obtain up-to-date history data.

3. The method according to claim 1, wherein the second history data recovered during the communicating satisfies a predetermined time condition.

4. The method according to claim 1, wherein the transaction-following data is representative of a current state of the user account.

5. The method according to claim 1, wherein the terminal is a communication terminal configured to receive short message service (SMS) messages using the 3D secure (3DS) payment protocol;
    the method further including receiving, by the terminal, third history data by means of at least one SMS message;
    wherein, during the analyzing, the first history data is aggregated with the second and third history data.

6. The method according to claim 1, wherein the first log file comprises at least one entry including second history data in the first data format, representative of a respective transaction;
    wherein the second log file comprises at least one entry including second history data in the second data format, representative of a respective transaction; and
    wherein, during the first read and the second read, the terminal reads each entry in the first log file and in the second log file one by one so long as the entry that is read corresponds to a transaction satisfying a predetermined time condition, such that the second history data recovered during the communicating satisfies the predetermined time condition.

7. The method according to claim 6, wherein the terminal detects that the second history data satisfies the time condition if the second history data is representative of a transaction carried out at an instant later than a predetermined fixed instant.

8. The method according to claim 6, wherein the terminal detects that the second history data satisfies the time condition if the second history data is representative of a transaction carried out at an instant lying in a time period of predefined duration terminating at the current instant at which the communicating is performed.

9. The method according to claim 1, wherein the second log file stored in the smart card comprises at least one first entry corresponding to a first transaction, and at least one earlier second entry corresponding to a second transaction earlier than the first transaction, the first entry being encoded in the second data format on the basis of said at least one second entry, and
    the second read including interpreting the first entry recovered in the second data format on the basis of said at least one second entry.

10. The method according to claim 1, wherein the transaction-following data comprise an up-to-date balance of the account or an up-to-date list of transactions.

11. The method according to claim 1, wherein communicating, by the terminal, contactlessly with a smart card comprises communicating with the smart card using the EMV protocol to read the second history data stored locally in the smart card.

12. The processing method according claim 1, wherein data types associated with the first data format comply with a standard defined by an issuing authority of the smart card.

13. A non-transitory computer readable data medium storing a computer program including instructions that, when executed by a processor of a terminal, perform a method comprising:
- collecting, from a remote server, first history data representative of at least one transaction associated with a user account;
- communicating contactlessly with a smart card, during which the terminal recovers second history data stored locally in a memory of the smart card, the second history data being representative of at least one transaction processed by the smart card in association with the user account;
- analyzing, by the terminal, to aggregate the first history data with the second history data in order to obtain up-to-date history data; and
- generating, based on the up-to-date history data, transaction-following data that includes up-to-date information about the state of the user account,
- wherein the communicating comprises:
  - a first read during which the terminal consults a first log file stored in a first memory zone in the smart card in order to recover second history data stored in a first data format; and
  - a second read during which the terminal consults a second log file stored in a second memory zone, distinct from said first memory zone, in the smart card in order to recover second history data stored in a second data format that is compressed in size compared with the first data format;
- wherein each entry of the first log file comprises a plurality of log data items of distinct data types in accordance with the first data format for characterizing a payment transaction processed by the smart card, and wherein each entry of the second log file comprises a selection, from among the log data items, excluding at least one of said data types.

14. The non-transitory computer readable data medium according claim 13, wherein data types associated with the first data format comply with a standard defined by an issuing authority of the smart card.

15. A terminal comprising:
- a collection module configured to collect on-line, from a remote server, first history data representative of at least one transaction associated with a user account;
- a communication module configured to communicate contactlessly with a smart card to recover second history data stored locally in a memory of the smart card, said second history data being representative of at least one transaction processed by the smart card in association with the user account;
- an analysis module configured to aggregate the first history data with the second history data in order to obtain up-to-date history data; and
- a generation module configured to generate transaction-following data from the up-to-date history data,
- wherein the communication module is configured to perform:
  - a first read during which the terminal consults a first log file stored in a first memory zone in the smart card in order to recover second history data stored in a first data format; and
  - a second read during which the terminal consults a second log file stored in a second memory zone, distinct from said first memory zone, in the smart card in order to recover second history data stored in a second data format that is compressed in size compared with the first data format;
- wherein each entry of the first log file comprises a plurality of log data items of distinct data types in accordance with the first data format for characterizing a payment transaction processed by the smart card, and wherein each entry of the second log file comprises a selection, from among the log data items, excluding at least one of said data types.

* * * * *